United States Patent Office 2,913,439
Patented Nov. 17, 1959

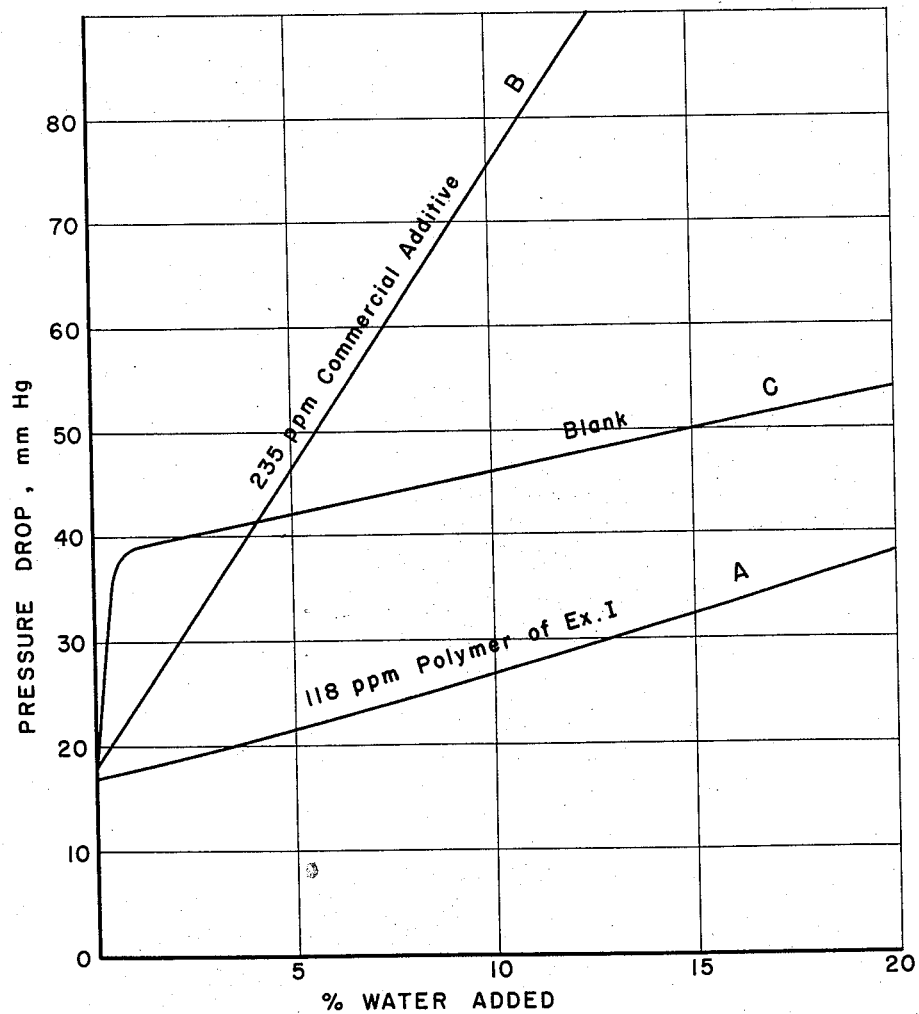

2,913,439

HYDROXY-CONTAINING COPOLYMERS AND THEIR PREPARATION

Arnold A. Bondi, Oakland, and Lawrence B. Scott, Lafayette, Calif., assignors to Shell Development Company, New York, N.Y., a corporation of Delaware Application December 1, 1955, Serial No. 550,391

5 Claims. (Cl. 260—87.3)

This invention relates to new polymeric products. More particularly, the invention relates to a new class of hydroxy containing copolymers which are particularly useful as anti-clogging agents and as pour point depressants.

Specifically, the invention provides new and particularly useful polymeric products comprising hydrolyzed copolymers of a vinyl ester of a lower fatty acid, and an ethylenically unsaturated monomer having a single ethylenic group which is in a terminal position and has an uninterrupted chain of at least 16 carbon atoms, and containing units of the vinyl ester, vinyl alcohol and the monomer containing at least 16 carbon atoms, said copolymer having an average molecular weight of about 4,000 to 50,000, an average of 1 to 6, and preferably 1 to 5, vinyl alcohol units (resulting from the hydrolysis) and vinyl ester units per unit of the monomer having the chain of at least 16 carbon atoms and 25% to 99% of the total vinyl alcohol and vinyl ester units being vinyl alcohol units. These special copolymers are preferably prepared by copolymerizing a vinyl ester of a lower fatty acid with the ethylenically unsaturated monomer having a single ethylenic group and containing at least 16 carbon atoms in such proportions as to form a copolymer having the desired molecular weight and an average of 1 to 6 units of the vinyl ester per unit of the monomer having the chain of at least 16 carbon atoms, and then hydrolyzing this product so as to convert from 25% to 99% of the vinyl ester linkages to hydroxyl groups.

This application is a continuation-in-part of our application Serial No. 357,374, filed May 25, 1953, now abandoned.

It is an object of the invention to provide a new class of polymeric products. It is a further object to provide new 3-component oleophilic surface-active copolymers and a method for their preparation. It is a further object to provide new hydroxy-containing copolymers which are particularly useful and valuable as fuel oil additives. It is a further object to provide new copolymers which are outstanding pour point depressants for lubricating oils. It is a further object to provide new copolymers which are useful as detergents and anti-wear agents for lubricating oils. It is a further object to provide new copolymers which are particularly useful as dispersing agents and surface-active agents for non-aqueous systems. These and other objects of the invention will be apparent from the following detailed description thereof.

It has now been discovered that these and other objects may be accomplished by the novel polymeric products of the invention comprising hydrolyzed copolymers of a vinyl ester of a lower fatty acid, and an ethylenically unsaturated monomer having a single ethylenic group which is in a terminal position and has an uninterrupted chain of at least 16 carbon atoms, and containing units of the vinyl ester, vinyl alcohol and the monomer containing at least 16 carbon atoms, said copolymer having an average molecular weight of 4,000 to 50,000, an average of 1 to 6, and preferably 1 to 5, vinyl alcohol units (resulting from the hydrolysis) and vinyl ester units per unit of the monomer having the chain of at least 16 carbon atoms and 25% to 99% of the vinyl alcohol and vinyl ester units being vinyl alcohol unts. As vinyl alcohol is unstable and unable to be used as such, the copolymers must be prepared by special method. This is accomplished preferably by copolymerizing a vinyl ester of a lower fatty acid with the ethylenically unsaturated monomer having a single ethylenic group and containing at least 16 carbon atoms in such proportions as to form a copolymer having the proper molecular weight and an average of 1 to 6 units of the vinyl ester per unit of the monomer having the chain of at least 16 carbon atoms, and then treating this product so as to convert from 25% to 99% of the vinyl ester linkages to hydroxyl groups.

It has been found that the above-described polymeric products having the critical features as to monomers, ratio of monomer units and molecular weight have many unobvious properties. They have been found, for example, to be particularly outstanding additives for fuel oils. When these polymers are added to the fuel oil, even in very small amounts, they display unexpected ability to inhibit the formation of a sludge and sediment during prolonged storage periods, and prevent discoloration of the fuel oil. In addition, these polymeric products are retained in the fuel oil and not lost or leached therefrom when the oil is brought in contact with water, as is the case with many of the commercial fuel oil additives. Superiority of the copolymers as fuel oil additives is shown in the examples at the end of the specification.

The above-described polymers have also been found to be valuable as pour point depressants and anti-wear agents and detergents for lubricating oils. In addition, the new copolymers have unexpectedly been found to be valuable as dispersing and surface-active agents for non-aqueous systems. They are particularly valuable, for example, as dispersing agents for carbon black in rubber and as dispersing agents for carbon particles in thermo-setting resins used in making electrical circuits and the like.

It is known to polymerize vinyl acetate in the presence of very small amounts of olefin as shown in U.S. Patent 2,668,809. The polymers in this case, however, contain a very small amount if any olefin in the copolymer. Thus, using 10% by weight of olefin in the mixture, one would at best obtain a polymer having the vinyl acetate and olefin in a ratio of 66 to 1. Such products do not have the unexpected properties of the products of the present invention as shown in the examples at the end of the specification.

The vinyl esters of the lower fatty acids used in making the special copolymers may be exemplified by vinyl acetate, vinyl butyrate, vinyl valerate and vinyl caproate. Vinyl acetate is particularly preferred.

The monomers having the single terminal ethylenic group and having a chain of at least 16 carbon atoms are preferably the alpha-olefins having at least 16 carbon atoms, such as octadecene-1, nonadecene-1, eicosene-1, heneicosene-1, docosene-1, tricosene-1, teracosene-1, pentacosene-1, hexacosene-1, octacosene-1, nonacosene-1, triacontene-1, and the like, and mixtures thereof or mixtures of these with very minor amounts of olefins containing at least 12 carbon atoms, such as decene-1, hexadecene-1, tetradecene-1, pentadecene-1, heptadecene-1, and the like. A portion of all of the alpha-olefin may be replaced by other long chain monomers, such as vinyl octadecyl ketone, vinyl octadecyl ether, allyl octadecyl ether, allyl eicosanyl ether, vinyl eicosanyl ether and the like. Particularly preferred monomers of this type to be used are the $C_{18}$ to $C_{22}$ alpha-olefins and mixtures thereof with lower alpha-olefins containing more than 16 carbon atoms.

The copolymers of the present invention are prepared by heating a vinyl ester of a lower fatty acid with the monomer having the chain of at least 16 carbon atoms in the presence of a peroxide catalyst so as to form a copolymer having from 1 to 6 units of the vinyl ester per unit of the monomer having the chain of at least 16 carbon atoms and a molecular weight between 4,000 and 50,000 and then treating this product so as to convert from 25% to 99% of the vinyl ester groups into hydroxyl groups.

In this method, it is essential first to prepare the copolymer of the monomers so as to have the monomer units in the desired ratio. The finished copolymer should have the vinyl ester and vinyl alcohol units and the units of the monomer containing at least 16 carbon atoms in a ratio varying from 1:1 to 6:1 and more preferably in a ratio of 1:1 to 5:1. Particularly preferred ratios are 1.5:1 to 4.5:1.

As the vinyl ester and the monomer having the chain of at least 16 carbon atoms have different polymerization rates, the proportions in which they enter the copolymer macromolecules will differ from the proportions in which they occur in the reaction mixture. It will be necessary, therefore, to determine before hand the ratio of concentrations of monomers needed to give copolymers having the two monomers in the above-described ratio. This can be easily accomplished by conducting a few routine runs and examining the composition of the resulting copolymer. The initial concentration of monomers can then be adjusted so as to give the copolymer of the desired composition. It has been found by this method, for example, that when the monomers are vinyl acetate and octadecene-1 and they are polymerized in a batch operation at temperature ranges from about 115° C. to 155° C. that the vinyl acetate enters the polymer chain at about 2 times the rate of the olefin. Accordingly, in order to obtain an initial polymer say of ratio of 5:1, the monomers should be combined in a ratio of about 2.5:1.

As the reaction progresses, the monomer concentration ratios change due to the difference in the rate of polymerization and, in some cases, the ratio will change so that it will not be producing copolymers having the monomers in the desired ratio. The superior products are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting value. This method is of particular value if the change in the ratio between the monomer concentrations during the copolymerization is slow and a considerable yield of copolymer has been obtained before the limiting values have been attained.

Another method is to adjust the ratio between the monomer concentrations by adding monomer during the course of the polymerization. In a copolymerization of the above-described two groups of monomers, it is usually sufficient if the monomer which is consumed at the fastest rate, such as the vinyl ester, is added to the reaction mixture. This addition can occur periodically or continuously.

To obtain copolymers wherein the greatest part of their macromolecules have the same composition and thus display their superior properties to the highest extent, it is preferred to keep the concentrations of the monomers constant as well as the ratio of concentrations constant. This is preferably obtained by adding all of the monomers at the rate at which they are consumed. This greatest uniformity of conditions is generally obtained in a continuous process whereby copolymerization takes place in a space from which the copolymer is drained off at the rate at which it is formed and in which the feed of monomers and other substances employed in the copolymerization exactly compensate for the consumption and drainage taking place when the copolymer is removed.

Control over the change of ratio can be made by periodic withdrawal of sample and analyzing the product or in a homogeneous system by simply observing a physical property of the mixture which varies with the ratio of concentrations of monomers, such as boiling point, refractive index, vapor pressure, specific gravity, and the like, and adding the monomer or monomers so as to bring the value up to the predetermined level for the desired product. This adjustment of the rate of addition can be and sometimes preferably is controlled by some automatic means. In the event that the boiling temperature of the mixture is the method employed in determining the rate of addition, one may use the effect of the varying temperature on the resistance of a metal wire forming part of circuit incorporating a Wheatstone bridge. In this circuit an electric or electronic potentiometer can be inserted which is connected with an electric, pneumatic or hydraulic regulating system controlling a pump or valve in the feed line through which the addition takes place.

Copolymers of the present invention which have the superior properties noted above are those having molecular weights between 4,000 and about 50,000 as determined by the light scattering technique described in Chem. Rev., vol. 40, page 319 (1948). Preferably the molecular weights range from about 15,000 to 30,000.

Any suitable conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, the nature and amount of the monomers and presence of added chain transfer agents. When the polymerization is accomplished in solution, the molecular weight of the product will be lower when the dilution is stronger, i.e., when the concentration of solvent is greater. In general, the higher the polymerization temperature the lower will be the molecular weight of the finished copolymer.

It has further been found that the higher the concentration of the olefin in the reaction mixture, the lower will be the molecular weight of the product. This is illustrated in Examples II to IV with the some monomer ratios, the molecular weights are also higher when the products are prepared by a continuous method wherein one or more of the monomers are added during the reaction.

Added materials that may be used as chain transfer agents in the preparation of the copolymers include alcohols, aldehydes, such as valeraldehyde, ketones, such as acetone, methyl ethyl ketone, ethers, such as diethyl ether, halogenated hydrocarbons, as carbon tetrachloride, halogenated alcohols, aldehydes, ethers, organic acids, such as alpha-bromopropionic acid and esters or anhydrides of such acids, such as propyl trichloroacetate, acid halides, such as acetyl chloride, esters of inorganic acids, such as tetraethyl silicate, tributyl phosphate, various nitrogen compounds, such as amines, cyanogen and nitro compounds, sulfur halides, benzene sulphonyl chloride, mercaptans, such as dodecyl mercaptan, and the related organic sulfur compounds. The amount of such agent employed will vary over a wide range but in most cases will be between 1% to 30% by weight of the material being polymerized.

The copolymers may be prepared in bulk, solvent solution, or in an aqueous emulsion or suspension system. Best results are obtained by heating the monomers in bulk or solvent solution and these are the preferred methods to be employed.

Catalysts used in the preparation of the copolymers are preferably the peroxide catalysts, such as, for example benzoyl peroxide, lauroyl peroxide, tertiary butyl hydroperoxide, 2,2-bis(tertiary butyl peroxy) butane, di-(tertiary butyl) peroxide, tertiary butyl perlargonate, hydrogen peroxide, sodium or potassium persulfate, percarbonate, peracetic acid, and the like. The amount of the catalyst added may vary over a considerable range. In general, the amount of the catalyst added will vary from 0.1% to 5% by weight of the material being polymerized. Preferred amounts vary from 1% to 2% by weight.

The temperature selected will vary depending chiefly on type of catalyst selected, the desired rate of reaction and molecular weight desired. Generally, the temperature will range from about 100° C. to 170° C. and more preferably from 120° C. to 160° C.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, the unreacted monomer or monomers are then removed, preferably by distillation.

A further essential step in the process is to treat the above noted copolymer so as to effect a 25% to 99% conversion of the vinyl ester groups to hydroxyl groups. Superior unexpected improvement as to water haze is obtained if one maintains about 90-95% conversion of acetate group to OH group.

The conversion can be accomplished by saponification using aqueous alkali, such as sodium hydroxide, or by an alcoholysis reaction wherein the copolymer is treated with a lower alkanol or mixture or lower alkanols and a catalyst, such as sodium ethoxide. The amount of reactants used, of course, will be determined by the number of the vinyl ester groups to be removed. If the ester groups are to be removed by the alcoholysis method, for example, there should be approximately one mole of alcohol used for every ester group removed. The degree of alcoholysis can also be controlled by addition of the ester to be found as shown in the examples.

After the saponification or alcoholysis reaction, the mixture is then treated to remove the reactants such as formed acid or ester, such as by distillation and then water washed to remove any salt impurities, such as sodium acetate, which may be retained in the product. This latter step is particularly important in order to obtain copolymers which can be used as additives for fuel oils without forming undesirable haze.

The hydroxy-containing polymers of the invention are substantially water-white to light colored viscous liquids to soft solids. They possess quite unexpected solubility and surface active properties which could not have been predicted and which enable them to be used for a wide variety of important applications. It has been found, for example, that the new polymers are valuable as ashless detergents, and as pour point depressants for lubricating oils. They are particularly outstanding, however, as additives for fuel oils as they are readily compatible therewith and when added even in small amounts act to inhibit formation of sludge and sediment during prolonged storage of the oils. In addition, these polymeric products act to prevent discoloration of the oils during the storage period. Further, the polymeric products are not easily leached or removed from the oils when exposed to water so that they are able to exert their anti-clogging and color stabilization properties over a longer period than many of the additives now used commercially. The fuel oils in which the copolymers are particularly effective are the hydrocarbon distillate fuel oils, such as treated or untreated cracked fuel oils, or mixtures of cracked fuels (thermally cracked and/or catalytically cracked) with straight run fuel oils, having components normally distilling at about 500° F. and having an end distillation point not exceeding 75° F. Generally such fuels have a boiling range of from 340° F. to about 700° F. and preferably have a boiling range of from about 400° F. to about 675° F. The copolymers are employed with these oils in amounts varying from about 10 p.p.m. to about 200 parts per million and preferably from 50 to 100 p.p.m.

The hydroxy-containing copolymers of the invention have also proved to be excellent dispersing agents and surface active agents for non-aqueous systems. The are especially valuable as assistants in the dispersing of carbon black in rubber, pigments in paint and carbon particles in thermosetting resins used in making electrical circuits. They are also valuable as metal surface conditioners to improve the spreading of Epon resin coatings and help overcome "cratering."

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

In the examples, the molecular weights were determined by light scattering method and the ratio of vinyl acetate to olefin groups was determined by analysis for ester values. The $C_{16}$ to $C_{18}$ olefin mixture used in the examples is made up predominantly of the $C_{18}$.

*Example I*

This example illustrates the preparation of an oleophilic surface active polymer from vinyl acetate and a mixture of $C_{16}$ to $C_{18}$ alpha-olefins and the unexpected properties of the polymer as an anti-screen clogging additive for fuel oils.

A. 2.5 moles of vinyl acetate and 1 mole of a mixture of $C_{16}$ to $C_{18}$ alpha-olefins made up predominantly of the $C_{18}$ olefin and 1% ditertiary butyl peroxide were placed in a stainless steel bomb and the air replaced with nitrogen. The bomb was heated to 115° C. until there was about 90% conversion. The product was topped at 185° C. at 1 mm. Hg pressure.

The polymer produced above was then mixed with methanol and sodium so as to effect a 95% conversion of the vinyl ester groups to OH groups. This was accomplished by adding 10 parts of methanol, 35 parts of isopropyl alcohol and 1 part of sodium methylate per 50 parts of the copolymer and heating with stirring for 8 hours at 70° C. Sodium acetate was then removed by washing twice with 1 part of a 33% isopropyl alcohol-water mixture. After settling, the lower layer was drained off and all low boiling components stripped off at a temperature of 110° C. at 90 mm. Hg. The resulting copolymer was a sticky yellow solid.

Analysis:

Ratio vinyl acetate and vinyl alcohol units
olefin units _____ 5/1
Mol. weight _____ 27,000
Percent hydrolyzed _____ 95

B. The polymer produced above possessed unexpected superior properties as an anti-screen clogging additive for fuel oils as shown by the following:

118 parts (per million parts of oil) of the above-described copolymer was added to a series of samples of unstabilized No. 3 fuel oil containing varying amounts of water. The anti-screen clogging properties of each sample was then determined. This was done by measuring the pressure drop of the oil-water mixture passing at constant flow rate through a 10 micron resin impregnated filter. The results are shown in the attached drawing (line A) in comparison to the results obtained with a similar series of samples containing 235 parts of a commercial fuel oil additive (line B) and the results obtained with a similar series of samples containing no additive (line C). In the drawing, the lower pressure drop, the smaller the amount of sludge formation.

The polymer produced above was also added in varying amounts to furnace oil containing 5% water and having been aged for 16 hours at 100° C. The anti-screen clogging properties of each sample was determined as in the preceding paragraph. In each case, there was a very low pressure drop. The exact results are shown in the following table.

| Amount of Copolymer, P. P. M.[1] | Pressure Drop, mm. Hg |
|---|---|
| 55 | 24.5 |
| 80 | 16 |
| 100 | 16 |
| 140 | 20 |

[1] P. p. m. (parts per million of fuel oil).

Example II

A hydrolyzed copolymer of vinyl acetate and the mixture of $C_{16}$ and $C_{18}$ olefins having a molecular weight of about 27,000 was prepared as in Example I. Samples of this product were then subjected to varying degree of hydrolysis by the method shown in Example I. The resulting hydrolyzed products were then tested as anti-screen clogging additives for No. 3 fuel oil containing 5% water. In each case, there was a very low pressure drop. The results are shown in the following table.

| Degree of Hydrolysis, Percent | Pressure Drop, mm. Hg |
|---|---|
| 32 | 28 |
| 62 | 25.5 |
| 92 | 22 |

Example III

This example illustrates the preparation of a hydrolyzed copolymer from vinyl acetate and a mixture of $C_{16}$ to $C_{18}$ olefins having a ratio of vinyl acetate and vinyl alcohol to olefin of 4.9 to 1, a molecular weight of about 20,000 and 91.9% of the vinyl acetate vinyl alcohol groups being vinyl alcohol groups.

300 parts of the mixture of $C_{16}$ to $C_{18}$ olefin was mixed with 389 parts of vinyl acetate and 7 parts of ditertiary butyl peroxide and the mixture placed in a steel bomb. The bomb was purged with nitrogen and sealed. It was then placed in an oil bath at 130° C. for 16 hours. At the end of that time the product was removed stripped of the unreacted monomers.

50 parts of the copolymer produced above was then mixed with 25 parts of methanol, 17.5 parts of isopropyl alcohol, .5 part of sodium methoxide and 240 parts of xylene solvent and the mixture refluxed for 8 hours. The alcoholized mixture was then stripped to yield a sticky yellow solid.

Analysis:

Ratio vinyl acetate and vinyl alcohol units/
    olefin units _____ 4.9:1
Mol. weight _____ 20,000
Percent hydrolyzed _____ 91.9

118 parts (percent hydrolyzed per million of fuel oil) of the above copolymer was added to No. 3 fuel oil containing 5% water and the anti-screen clogging properties determined as in Example I. The pressure drop in this case was only 23 mm. Hg.

Example IV

This example illustrates the preparation of a hydrolyzed copolymer from vinyl acetate and a mixture of $C_{16}$ to $C_{18}$ olefins having a ratio of vinyl acetate and vinyl alcohol to olefin of 4.1 to 1, a molecular weight of 15,000 and 91.3% of the vinyl acetate groups+vinyl alcohol groups being vinyl alcohol groups.

300 parts of the $C_{16}$ to $C_{18}$ olefin mixture was mixed with 292 parts of vinyl acetate and 6.0 parts of ditertiary butyl peroxide and the mixture placed in a steel bomb. The bomb was purged with nitrogen and sealed. It was then placed in an oil bath at 130° C. for 16 hours. At the end of that time, the product was removed and stripped of the unreacted monomers.

50 parts of the copolymer produced above was then mixed with 25 parts of methanol, 17.5 parts of isopropyl alcohol, 0.50 part of sodium methoxide, 120 parts of xylene solvent and 35 parts of water and the mixture refluxed for 8 hours. The alcoholized mixture was then stripped to yield a yellow solid having the following analysis:

Ratio vinyl acetate and vinyl alcohol units/olefin
    units _____ 4.1:1
Mol weight _____ 15,000
Percent hydrolyzed _____ 91.3

118 parts (percent hydrolyzed per million of fuel oil) of the above copolymer was added to No. 3 fuel oil containing 5% water and the anti-screen clogging properties determined as in Example I. The pressure drop in this case was only 23 mm. Hg.

Example V

This example illustrates the preparation of a hydrolyzed copolymer from vinyl acetate and a mixture of $C_{16}$ to $C_{18}$ olefins having a ratio of vinyl acetate and vinyl alcohol units to olefin units of 2.6 to 1, a molecular weight of 12,000 and 92.7% of the vinyl acetate and vinyl alcohol units being vinyl alcohol units.

300 parts of the mixture of $C_{16}$ to $C_{18}$ olefins was mixed with 185 parts of vinyl acetate and 4.9 parts of ditertiary butyl peroxide and the mixture placed in a steel bomb. The bomb was purged with nitrogen and sealed. It was then placed in an oil bath at 130° C. for 16 hours. At the end of that time, the product was removed and stripped of the unreacted monomers.

50 parts of the copolymer produced above was then mixed with 25 parts of methanol, 17.5 parts of isopropyl alcohol, 0.5 part of sodium methoxide, 120 parts of xylene solvent and 35 parts of water and the mixture refluxed for 8 hours. The alcoholized mixture was then stripped to yield a yellow solid having the following analysis:

Ratio vinyl acetate and vinyl alcohol units/olefin
    units _____ 2.6:1
Mol. weight _____ 12,000
Percent hydrolyzed _____ 92.7

118 parts (percent hydrolyzed per million of fuel oil) of the above copolymer was added to No. 3 fuel oil containing 5% water and the anti-screen clogging properties determined as in Example I. The pressure drop in this case was only 25 mm. Hg.

Example VI 1.9 moles of vinyl acetate and 1 mole of the mixture of $C_{16}$ to $C_{18}$ olefin and 1% ditertiary butyl peroxide were placed in a stainless steel bomb and the air replaced with nitrogen. The bomb was heated to 115° C. until there was about 90% conversion. The product was topped at 185° C. at 1 mm. Hg pressure.

The copolymer produced above was then mixed with methanol and sodium so as to effect a 95% conversion of the vinyl ester groups to OH groups as shown in Example I. The resulting product was then dispersed in heptane and topped. The resulting copolymer was a sticky yellow solid. Analysis: vinyl ester and vinyl alcohol to olefin ratio 2.6:1, mol. weight 11,000, 95% hydrolyzed.

100 parts (per million parts of oil) of the copolymer was added to an unstabilized No. 3 fuel oil. The antiscreen clogging properties were then determined as follows: Approximately one gallon of the test fuel is filtered through a 200 mesh screen and thereafter steamed and circulated through a 100 mesh Monel screen 5/8" in diameter at the rate of 36 ml./min. for a period of 16 hours at room temperature. The extent of screen clogging is measured by the pressure drop across the screen. A constant flow rate is maintained by metering pumps and the pressure drop across the screen is measured by means of an open end manometer. The above test fluid showed a pressure drop of 4 as compared to 109 for a similar fluid without the additive.

*Example VII*

1 mole of vinyl acetate and 1 mole of a mixture of $C_{16}$ to $C_{18}$ olefin and 1% ditertiary butyl peroxide were placed in a stainless steel bomb and the air replaced with nitrogen. The bomb was heated to 115° C. until there was about 90% conversion. The product was topped at 184° C. at 1 mm. Hg pressure.

The copolymer produced above was then mixed with methanol and sodium so as to effect a 95% conversion of the vinyl ester groups to OH groups as shown in Example I. The resulting product was then dispersed in heptane and topped. The product was a sticky yellow solid. Analysis: vinyl ester and vinyl alcohol to olefin ratio 2:1, mol. weight 8,000, 95% hydrolyzed.

100 parts (per million parts of oil) of the copolymer was added to an unstabilized No. 3 fuel oil and the antiscreening properties determined as in the preceding example. The test fluid showed a pressure drop of 3 as compared to a drop of 109 for the unstabilized fuel oil.

*Example VIII*

Another copolymer of vinyl acetate and octadecene-1 was prepared by warming 1.6 moles of vinyl acetate to 1 mol of octadecene-1 and 1% benzoyl peroxide and the mixture heated to 80° C. for 24 hours. The monomers were stripped off in a stirred vessel at a temperature of 190° C. at 2 mm. Hg. Alcoholysis of the copolymer was carried out in a glass lined kettle equipped with stirrer and reflux condenser. The kettle was charged with 140 parts of the copolymer and 105 parts of ethyl alcohol in which .35 part of metallic sodium has been dissolved. The charge was stirred and refluxed for 24 hours. After the sodium alcoholate was neutralized with glacial acetic acid, the alcohol was distilled off to a final kettle temperature of 150° C. at 20 mm. Hg. Analysis of the resulting product indicated that the copolymer had a vinyl acetate and vinyl alcohol to olefin ratio of 3.6:1, 85% hydrolysis of the vinyl ester to OH groups and a molecular weight of 16,500.

100 parts (per million of oil) of the copolymer was added to unstabilized No. 3 fuel oil. The resulting composition had good color stability and on storage failed to deposit any sludge or sediment. The composition also showed low pressure drop when tested by the method shown in the preceding example.

*Example IX*

The preparation process shown in the preceding example was repeated with the exception that the conditions were varied so as to form products having different ratios of vinyl acetate to olefin and different degrees of hydrolysis as shown in the following table.

| Vinyl Acetate and Vinyl Alcohol to Olefin Ratio in Polymer | Degree of Alcoholysis, Percent |
|---|---|
| 4.2 | 97 |
| 3.35 | 95 |
| 4.06 | 88 |
| 4.42 | 61 |

In all cases, the copolymers proved to be good antiscreen clogging agents for fuel oils and gave results similar to those obtained with the polymer described in the preceding example.

*Example X*

This example illustrates the preparation of a hydrolyzed copolymer of vinyl acetate and octadecene-1 using a steady state.

Undistilled vinyl acetate and octadecene-1 were charged to an autoclave in a 2.5 mole ratio. After heating to 140° C. 0.3% ditertiary butyl peroxide (based on monomer charge) was added. Polymerization was carried out at 145° C. for 5 hours, while vinyl acetate equal to that originally charged was added at a rate designed to keep the vinyl acetate/olefin mole ratio approximately constant at 2.5. The ditertiary butyl peroxide was added at a fixed rate to maintain the peroxide concentration at about 0.3% of the charge. Olefin conversion at the end of 5 hours was about 95%. The unconverted monomers were then stripped off with the aid of a nitrogen purge.

The above copolymer was then mixed with methanol and sodium so as to effect a 95% conversion of the vinyl ester groups to OH groups. Analysis of the resulting copolymer showed the following:

Ratio vinyl acetate and vinyl alcohol olefin _____ 5/1
Mol. weight _____ 20,000

118 parts (per million of the oil) of the above copolymer was added to unstabilized No. 3 fuel oil. The resulting composition has good color stability and on storage failed to deposit any sludge or sediment. The composition also showed low pressure drop when tested by the method shown in Example I.

*Example XI*

This example illustrates the preparation of a hydrolyzed copolymer of vinyl acetate and octadecene-1 using a steady state wherein the finished product has a vinyl acetate and vinyl alcohol unit to olefin unit ratio of 4.9:1, a molecular weight of 30,000 and 90% of the vinyl acetate and vinyl alcohol units being vinyl alcohol units.

5450 parts of octadecene-1 and 4680 parts of vinyl acetate were charged to a reaction vessel and heated to 140° C. 76 parts of a 50% by volume solution of ditertiary butyl peroxide was slowly added to the mixture. Vinyl acetate was continuously added to the reaction mixture at the rate of 1690 parts the first hour, 1100 parts the second hour and 900 parts the third hour. The ditertiary butyl peroxide solution was added to the reaction mixture at the rate of about 40 parts per hour. At the end of five hours, the reaction was stopped and the mixture stripped of unreaction monomer.

50 parts of the copolymer prepared above was mixed with 42.5 parts of methanol, 120 parts of xylene solvent, 0.5 part of sodium methylate and 1 part of methyl acetate and the mixture refluxed for 2 hours. The alcoholyzed mixture was then stripped to yield a yellow solid having the following analysis:

Vinyl acetate and vinyl alcohol units/olefin units _ 4.9:1
Mol. weight _____ 30,000
Percent hydrolyzed _____ 90

118 parts (per million of oil) of the above copolymer was added to unstabilized No. 3 fuel oil containing 5% water. The resulting composition had good color stability and on storage failed to deposit any sludge or sediment. The composition also showed low pressure drop when tested by the method shown in Example I.

*Example XII*

Example XI was repeated with the exception that in the alcoholysis step the amount of the methyl acetate added was varied as indicated below. This gave copolymers having the degree of hydrolysis shown in table.

| Amount of Methyl Acetate (parts) | Degree of Hydrolysis, Percent |
|---|---|
| 3 | 83.0 |
| 10 | 70.5 |
| 20 | 42.9 |

Each of the hydrolyzed copolymers prepared above was then added to No. 3 fuel oil in amounts of 100 parts per million of the oil. In each case, the copolymers proved to be good anti-screen clogging agents for fuel oils and gave results similar to those obtained with the polymers described above.

*Example XIII*

This example illustrates the preparation of a hydrolyzed copolymer of vinyl acetate and octadecene-1 using a steady state wherein the finished product had a vinyl acetate and vinyl alcohol unit to olefin unit ratio of 4.1:1, a mol weight of 20,500 and about 92% of the acetate units hydrolyzed to vinyl alcohol units.

5630 parts of octadecene-1 and 3900 parts of vinyl acetate were charged to a reaction vessel and 76 parts of a 50% by volume of ditertiary butyl peroxide-octadecene-1 mixture added. Vinyl acetate was continuously added to the reaction mixture at the rate of 1310 parts the first hour, 852 parts the second hour, 698 parts the third hour, 605 parts the fourth hour and 437 parts the fifth hour. The mixture of peroxide and olefin was also added at the rate of about 43 parts per hour. At the end of the fifth hour, the reaction was stopped and the unused reactants stripped off.

50 parts of the resulting copolymer was then mixed with 120 parts of xylene solution, 43 parts of methyl alcohol and 0.5 part of sodium ethoxide and refluxed for two hours. The product was then stripped of the alcohol and ester to form a yellow solid having the following analysis:

Vinyl acetate and vinyl alcohol units to olefin
  units _____ 4.1:1
Mol. weight _____ 20,500
Percent hydrolyzed _____ 92

100 parts (per million of oil) of the above copolymer was added to unstabilized No. 3 fuel oil containing 5% water. The resulting composition had good color stability and on storage failed to deposit any sludge or sediment. The composition also showed low pressure drop when tested by the method shown in Example I.

*Example XIV*

This example illustrates the preparation of a hydrolyzed copolymer of vinyl acetate and octadecene-1 having a ratio of vinyl acetate and vinyl alcohol units to olefins of 20:1, and shows that such copolymers are of no use as anti-screen clogging agents.

1555 parts of octadecene-1 and 5390 parts of vinyl acetate were charged into a reaction vessel and heated to 135° C. 219 parts of a solution made up of 72 parts of ditertiary butyl peroxide and 528 parts of octadecene-1 was added thereto. Vinyl acetate was then added at the following rate: 1811 parts the first hour, 1180 parts the second hour, 966 parts the third hour, 836 parts the fourth hour and 604 parts the fifth hour. The mixture of peroxide and olefin was also added to the reaction mixture continuously over the five hours. At the end of the fifth hour, the reaction was stopped and the unused reactants stripped off.

50 parts of the resulting product was then mixed with 120 parts of xylene, 43 parts of methyl alcohol and 0.5 part of sodium ethoxide and refluxed for two hours. The product was then stripped to form a yellow solid having the following analysis:

Vinyl acetate and vinyl alcohol units to olefin
  units _____ 20:1
Mol. weight _____ 40,000
Percent hydrolyzed _____ 85

The above copolymer had very poor solubility in No. 3 fuel oil and had no utility as an anti-screen clogging agent for that oil.

*Example XV*

This example illustrates the preparation of a hydrolyzed copolymer of a $C_{22}$ alpha olefin and vinyl acetate.

34.8 parts of the $C_{22}$ alpha olefin were mixed with 13.7 parts of vinyl acetate and 0.49 part of benzoyl peroxide and the mixture heated in a steel bomb at 80° C. The unreacted monomers were removed and the copolymer treated with sodium hydroxide to effect a 93% hydrolysis of the acetate groups. The resulting product had the following analysis:

Ratio vinyl acetate and vinyl alcohol/olefin _____ 1.4:1
Mol. weight _____ 9,500
Percent hydrolyzed _____ 93

*Example XVI*

This example illustrates the preparation of a hydrolyzed copolymer from vinyl acetate and a hexadecene-1 having a ratio of vinyl acetate and vinyl alcohol units to olefin units of 1.6 to 1, a molecular weight of about 11,000 and 90% of the vinyl acetate and vinyl alcohol units being vinyl alcohol units.

22.4 parts of hexadecene-1 was mixed with 13.7 parts of vinyl acetate and 0.34 part of benzoyl peroxide and the mixture placed in a steel bomb. The bomb was purged with nitrogen and sealed. It was then placed in an oil bath at 80° C. for 24 hours. At the end of that time, the product was removed and stripped of the unreacted monomers.

The copolymer produced above was then mixed with methanol and sodium methoxide in xylene to effect a 90% hydrolysis of the vinyl acetate groups. The alcoholized mixture was then stripped to yield a light colored sticky solid having the following analysis:

Ratio vinyl acetate and vinyl alcohol units/olefin
  units _____ 1.6:1
Mol. weight _____ 10,000
Percent hydrolyzed _____ 90

This copolymer proved to be an effective anti-clogging agent for No. 3 fuel oil containing 5% water in amounts varying from 100 parts to 150 parts per million of oil.

Related copolymers are obtained by replacing the hexadecene-1 in the above process with equal amounts of each of the following: mixture of $C_{16}$ and $C_{20}$ alpha olefins and a mixture of $C_{18}$ and $C_{20}$ alpha olefins.

*Example XVII*

The polymers prepared in Examples V, VII, VIII, IX and XV were tested as pour point depressants for East Texas 250 neutral distillate in amounts varying from 0.25% to .5% by weight of the oil. In each case, the polymer caused a depression of from 20° F. to 35° F.

*Example XVIII*

A copolymer of dodecene and vinyl acetate was prepared by heating 60 parts of vinyl acetate and 140 parts of dodecene in the presence of 4 parts of tert-butyl peroxide at 130° C. for 16 hours under nitrogen. The product was topped at 200° C. at 1.0 mm. to give a water white viscous liquid. The copolymer was then hydrolyzed with aqueous sodium hydroxide to give a very viscous product having the following analysis:

| | |
|---|---|
| Ratio vinyl acetate and vinyl alcohol units/olefin units | 2:1 |
| Mol. weight | 10,000 |
| Percent hydrolyzed | 93 |

This product failed to have above-noted superior properties. When added to East Texas 250 neutral distillate in amount of .5% by weight it failed to cause any depression in the pour point.

We claim as our invention:

1. An oil soluble hydroxy-containing polymeric product comprising a hydrolyzed copolymer of a vinyl ester of a lower fatty acid which acid contains up to six carbon atoms, and an ethylenically unsaturated hydrocarbon having a single ethylenic group which is in a terminal position and has an uninterrupted chain of from 16 to 30 carbon atoms, and containing units of the vinyl ester, vinyl alcohol and the monomer possessing at least 16 carbon atoms, said copolymer having an average of 1 to 6 vinyl alcohol and vinyl ester units per unit of the monomer having the chain of at least 16 carbon atoms and 25% to 99% of the vinyl alcohol and vinyl ester units being vinyl alcohol units, and the said copolymer having a molecular weight between 4,000 and 50,000 as determined by the light scattering method.

2. An oil soluble polymeric product as defined in claim 1 wherein the vinyl ester is vinyl acetate.

3. An oil soluble polymeric product as defined in claim 1 wherein the copolymer has an average of 1 to 5 units of the vinyl alcohol and vinyl ester unit per unit of the monomer having the chain of from 16 to 30 carbon atoms and a molecular weight of about 30,000.

4. An oil soluble polymeric product as defined in claim 1 wherein the monomer having the chain of from 16 to 30 carbon atoms is an alpha-olefin mixture containing octadecene-1.

5. An oil soluble hydroxy-containing polymeric product comprising a copolymer of (1) vinyl alcohol, (2) vinyl acetate, and (3) a monoolefin mixture containing octadecene-1, said copolymer having an average of 3 to 5 vinyl alcohol and vinyl acetate groups per unit of alpha-olefin and from 95% to 99% of the vinyl alcohol and vinyl acetate units being vinyl alcohol units, and having a molecular weight of between 15,000 and 30,000 as determined by the light scattering method.

References Cited in the file of this patent

UNITED STATES PATENTS

| | | |
|---|---|---|
| 2,386,347 | Roland | Oct. 9, 1945 |
| 2,421,971 | Sperati | June 10, 1947 |
| 2,551,643 | Seger et al. | May 8, 1951 |
| 2,784,136 | Dierick et al. | Mar 5, 1957 |

FOREIGN PATENTS

| | | |
|---|---|---|
| 703,252 | Great Britain | Feb. 3, 1954 |